(12) United States Patent
Shih et al.

(10) Patent No.: US 6,769,808 B2
(45) Date of Patent: Aug. 3, 2004

(54) COMPOSITE FLUID DYNAMIC BEARING AND ITS MANUFACTURING METHOD

(75) Inventors: Wun-Chang Shih, Hsinchu (TW); Ching-Hsing Huang, Hsinchu (TW); Yu-Hsiu Chang, Hsinchu (TW); Hung-Kuang Hsu, Hsinchu (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 49 days.

(21) Appl. No.: 10/339,497

(22) Filed: Jan. 10, 2003

(65) Prior Publication Data

US 2004/0066992 A1 Apr. 8, 2004

(30) Foreign Application Priority Data

Oct. 8, 2002 (TW) .................................... 91123163 A

(51) Int. Cl.⁷ ............................................. F18C 32/06
(52) U.S. Cl. ..................... 384/114; 384/100; 29/898.02
(58) Field of Search ................................. 384/100, 114, 384/107; 360/99.08, 98.07; 29/898.02

(56) References Cited

U.S. PATENT DOCUMENTS

| 3,484,143 | A | * | 12/1969 | Sibley et al. | ................ 384/114 |
| 5,932,946 | A | * | 8/1999 | Miyasaka et al. | ........... 384/100 |
| 5,941,646 | A | * | 8/1999 | Mori et al. | .................. 384/100 |

* cited by examiner

Primary Examiner—Thomas R. Hannon
(74) Attorney, Agent, or Firm—Birch, Stewart, Kolasch & Birch, LLP

(57) ABSTRACT

A composite fluid dynamic bearing and its manufacturing method is disclosed. By machining a plurality of bearings independently, the grooves of each bearing have uniform slopes. Then the method of the invention combines the bearings, which have different slope of the grooves, to form a bearing module having pressure-generating grooves. In this way the precision of the machining grooves of bearings can be improved.

15 Claims, 7 Drawing Sheets

COMPOSITE FLUID DYNAMIC BEARING AND ITS MANUFACTURING METHOD

FIELD OF THE INVENTION

The invention relates to a composite fluid dynamic bearing and its manufacturing method for small motors, and particularly a composite fluid dynamic bearing and its manufacturing method capable of achieving increased production yield and improved precision.

BACKGROUND OF THE INVENTION

Bearings are widely used in rotational machines to achieve the functions of support, reducing friction and carrying loads, such as in spindle motors. With continuous advances in technology, components are becoming smaller and higher precision. Demand for precision bearings is also increasing. In general, the precision bearings that are most commonly used are ball bearings. However, they also have their share of problems, such as noise, not enough rotational precision and high cost for miniaturization. Hence they cannot fully meet the requirements of miniaturization and precision. As a result, fluid dynamic bearings have been developed to provide greater precision, less noise and greater resistance to vibration.

The fluid dynamic bearing has small grooves formed on the surface of the inner hole of the bearing to contain the lubrication medium (as the grooves are very small in size, the amount of lubrication medium also is small). When the spindle rotates, the lubrication medium in the grooves is moved to generate dynamic pressure to keep the spindle in the center. As the pressure is generated by rotation, at the initial rotation stage of the spindle, the pressure is not yet generated, so that the bearing wear is occurred. In addition, machining on the inner hole of the bearing is quite difficult, and high precision dimensions are difficult to control (in general, the width of the grooves is about 100 μm, while the depth of the grooves is even smaller). Oil seal and injection also are problematic.

Many techniques have been proposed in the prior art to resolve the problems with the fluid dynamic bearings mentioned above. For machining the small grooves on the surface of the inner hole of the bearing, there are techniques such as machining with cutting tools, machined by rolling, by plastics injection, by etching, by assembly, by machining after plating. However, all these methods do not completely overcome the difficulty of machining the small grooves on the inner hole surface, and the variability of forming different types of grooves. For instance, for the widely adopted "herringbone" groove, machining is difficult, cutting tools are difficult to make, and high precision fabrication machines are required. Some even require special cutting tools and machinery. As a result, production cost increases significantly.

SUMMARY OF THE INVENTION

The primary object of the invention is to provide a composite fluid dynamic bearing and its manufacturing method to overcome the aforesaid problems and to improve the machining of the small grooves on the surface of the inner hole and offer groove variations to increase the efficiency of the fluid dynamic bearing.

The composite fluid dynamic bearing and its manufacturing method of the invention involves dividing a bearing into a number of small sections for machining separately. The grooves formed on the surface of the inner hole of each section have a uniform slope. The sections with different groove slopes are coupled and assembled alternately to form a bearing module with pressure-generating grooves. As each section of the bearing is formed by machining with one uniform slope, precision requirements for the cutters and machinery are less severe, and precision of the grooves on the surface of the inner hole of the fluid dynamic bearing can be enhanced.

The composite fluid dynamic bearing of the invention includes a plurality of bearing sections that have grooves formed on the inner holes with different slopes. The grooves formed on the surface of the inner hole of each bearing section have a uniform slope. Each bearing section may be made by cutting the bearing that has the grooves of a uniform slope formed on the surface of the inner hole by machining. It also may be formed by directly machining on a bearing section of a selected length. Next, the bearing sections with grooves of different slopes are coupled alternately to form a bearing module with pressure-generating grooves. Then the bearing module is installed in a bearing seat to form the composite fluid dynamic bearing.

As the pressure-generating grooves of the fluid dynamic bearing are formed by machining on the bearing section, the forms of pressure-generating grooves are versatile by altering the coupling of the bearing sections. Moreover, forming the grooves of a uniform slope in the surface of the inner hole of the bearing section makes precision requirements of the cutting tools and machinery less critical. As a result, precision and efficiency of fabricating the pressure-generating grooves on the fluid dynamic bearing is improved.

The foregoing, as well as additional objects, features and advantages of the invention will be more readily apparent from the following detailed description, which proceeds with reference to the accompanying drawings.

DESCRIPTION OF THE PREFERRED EMBODIMENTS

The composite fluid dynamic bearing and its manufacturing method of the invention aims at overcoming the problems of fabricating the small grooves on the surface of the inner hole of fluid dynamic bearings. The grooves on the surface of the inner hole function as pressure-generating grooves to provide hydrodynamic pressure to support and lubricate the spindle when it rotates in the fluid dynamic bearing. The grooves on the surface of the inner hole have a turning spot to collect the lubrication oil during spindle rotation to provide support and lubrication of the spindle. Taking the most commonly used pressure-generating groove "herringbone" as an example the lubrication oil is gathered on the sharp end of the two wings. Forming the turning spot on the miniature groove on the surface of the inner hole greatly increases the difficulty of machining. To attack this problem, the invention fabricates the pressure-generating grooves by sections, i.e. the pressure-generating grooves are divided into several sections, each with grooves of the same slope. Each section is fabricated independently, and the finished sections are coupled and assembled together. The following embodiments of the invention use the "herringbone" groove as examples.

Figure 1B:
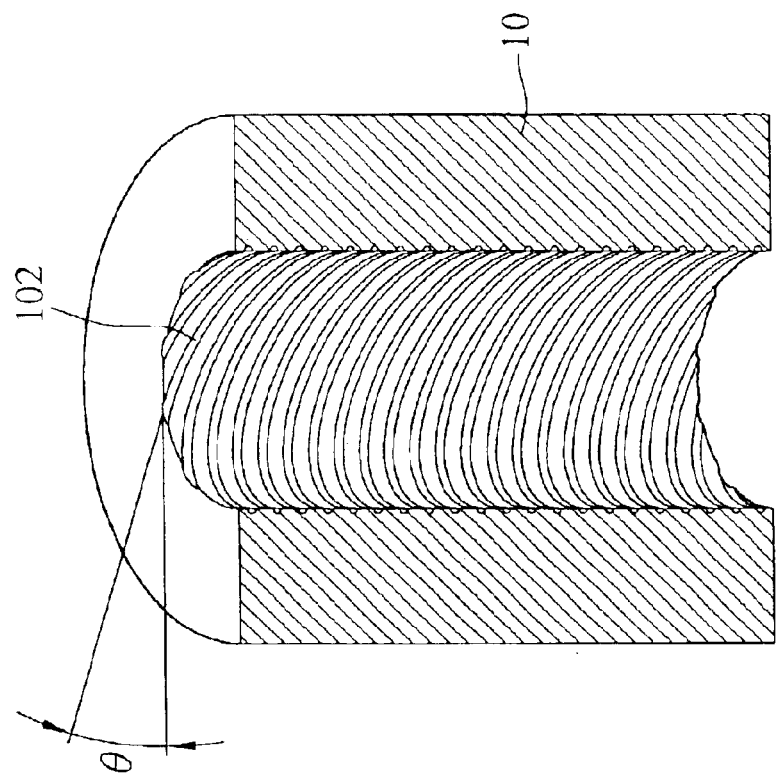
FIGS. 1A–1D are schematic views of fabricating a bearing by sections according to the invention.
Figure 1A:
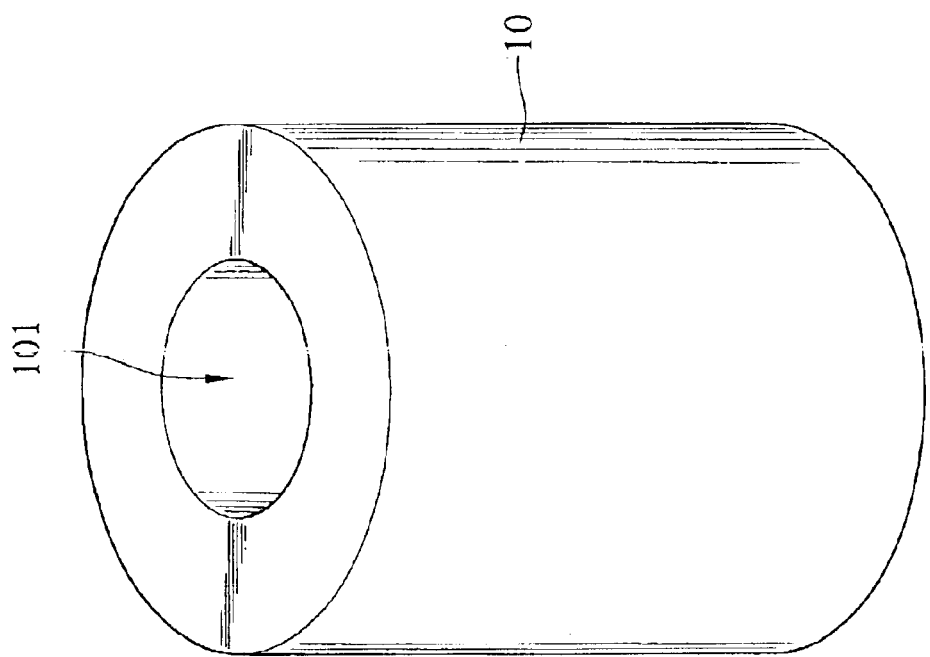
Figure 1C:
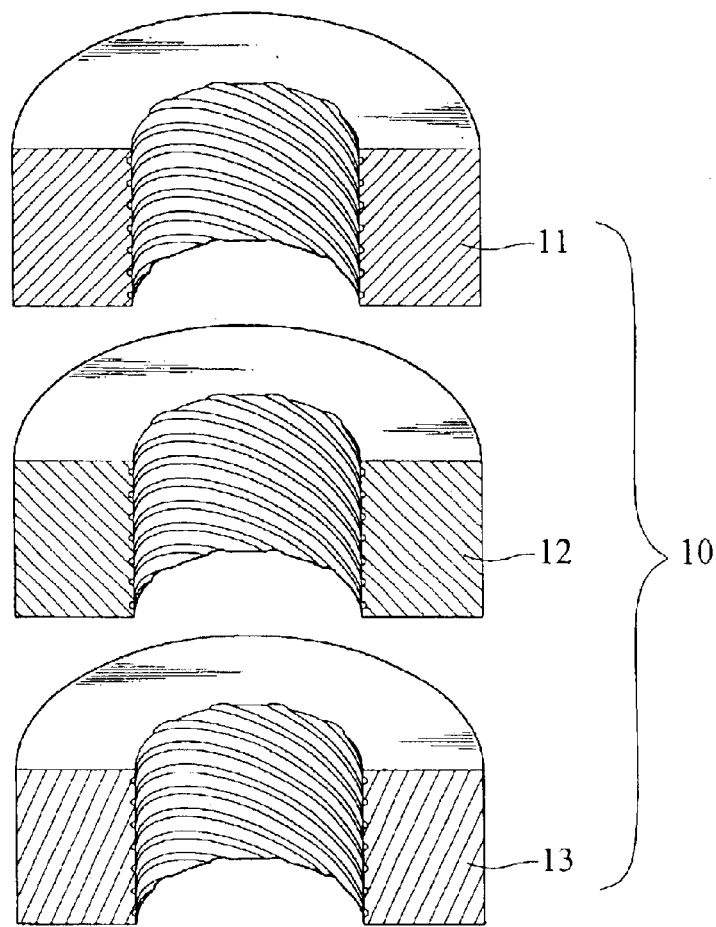
Figure 1D:
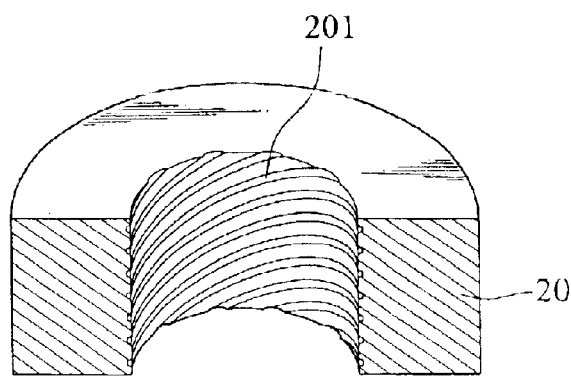

Referring to FIG. 1A, a bearing 10 is provided which has an inner hole 101 with a diameter slightly larger than the outer diameter of a spindle to be housed (not shown in the drawing). On the inner hole 101, grooves 102 of a uniform slope are fabricated. Because "herringbone" grooves are required, the helical grooves are formed in the clockwise direction (as shown in FIG. 1B). The grooves 102 and the inner hole of the bearing 10 form an included angle θ, preferably between 10 and 40 degrees. Then the bearing 10 is cut to several sections of selected lengths. As shown in FIG. 1C, the bearing 10 is cut to form a first bearing section 11, a second bearing section 12 and a third bearing section 13. Next, another bearing 20 with counterclockwise grooves 201 formed on an inner hole 201 is fabricated. It may be formed like the first bearing section 11, or be fabricated directly with the selected length without cutting.

Figure 2B:
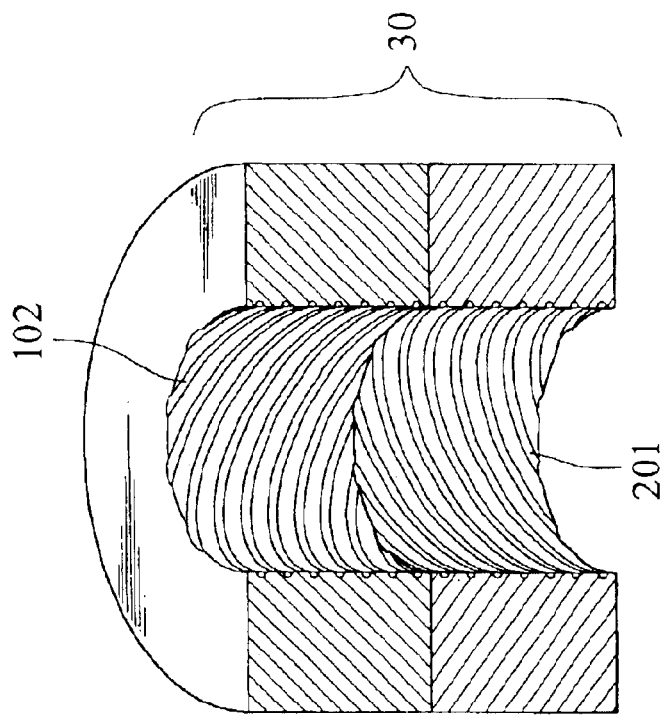
FIGS. 2A and 2B are schematic views of assembling the bearing module according to the invention.
Figure 2A:
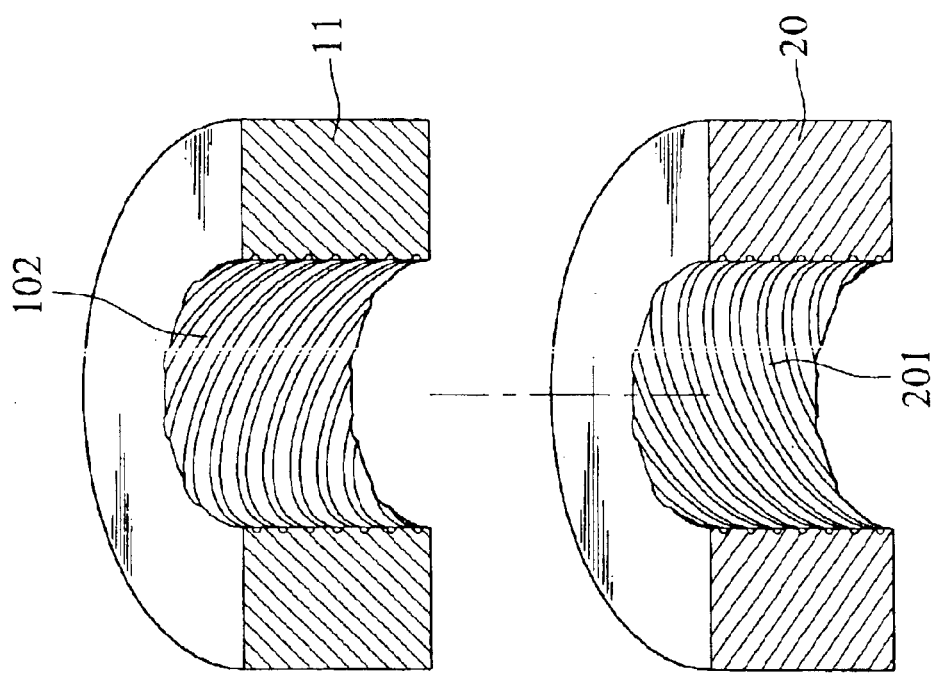

Referring to FIG. 2A, the two searing sections 11 and 20 are coupled alternately with the grooves 102 and 201 aligned with each other to form a bearing set 30 (as shown in FIG. 2B) with pressure-generating grooves. Since the bearing set 30 is formed by coupling, each bearing section 11 or 20 has a shorter length, and has grooves 102 or 201 of a uniform slope. Thus machining is greatly simplified, and precision may be more easily controlled. In addition, demand for cutters is less critical and production yield increases.

Figure 2C:
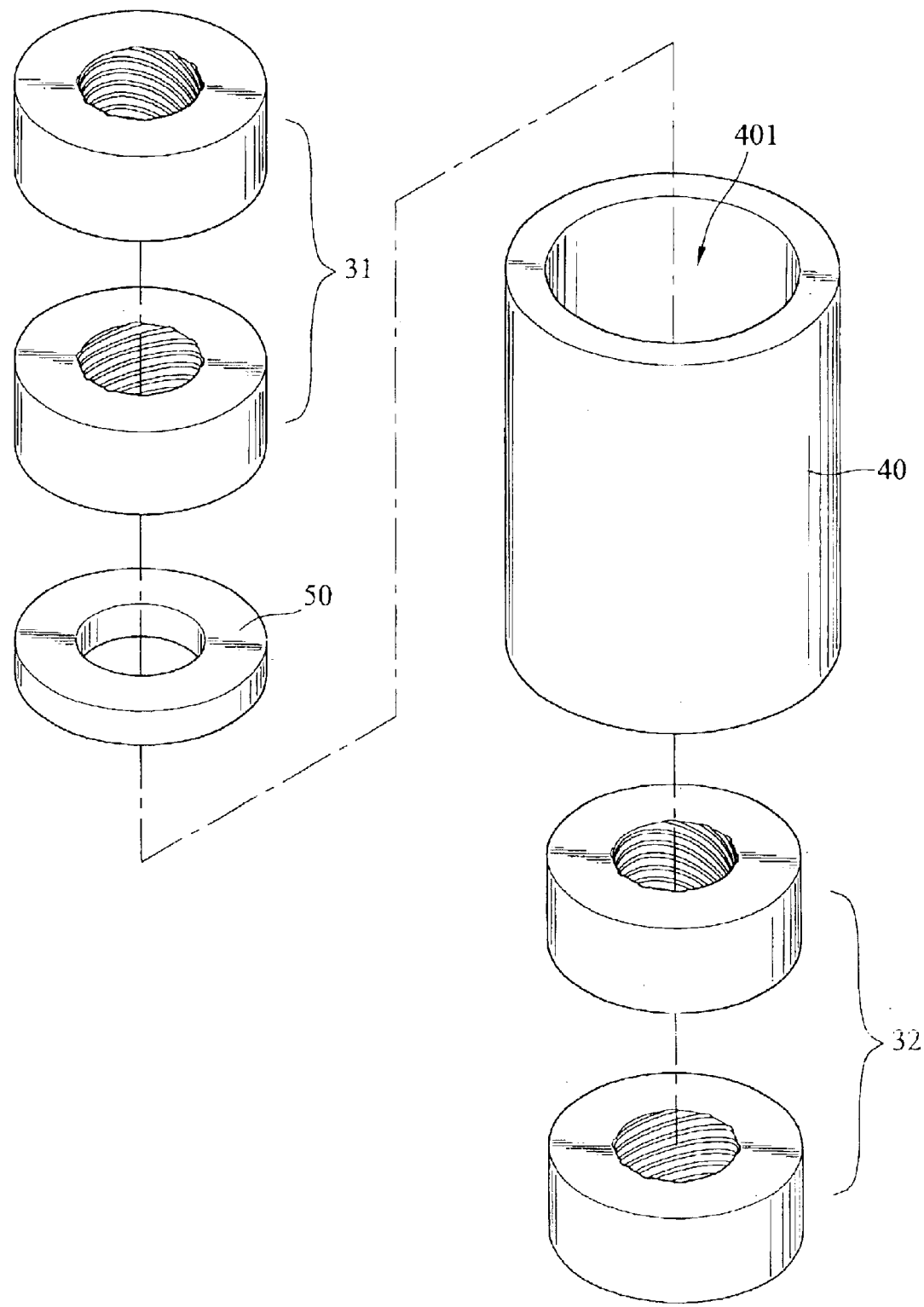
FIGS. 2C and 2D are schematic views of installing the bearing module in a bearing seat according to the invention.
Figure 2D:
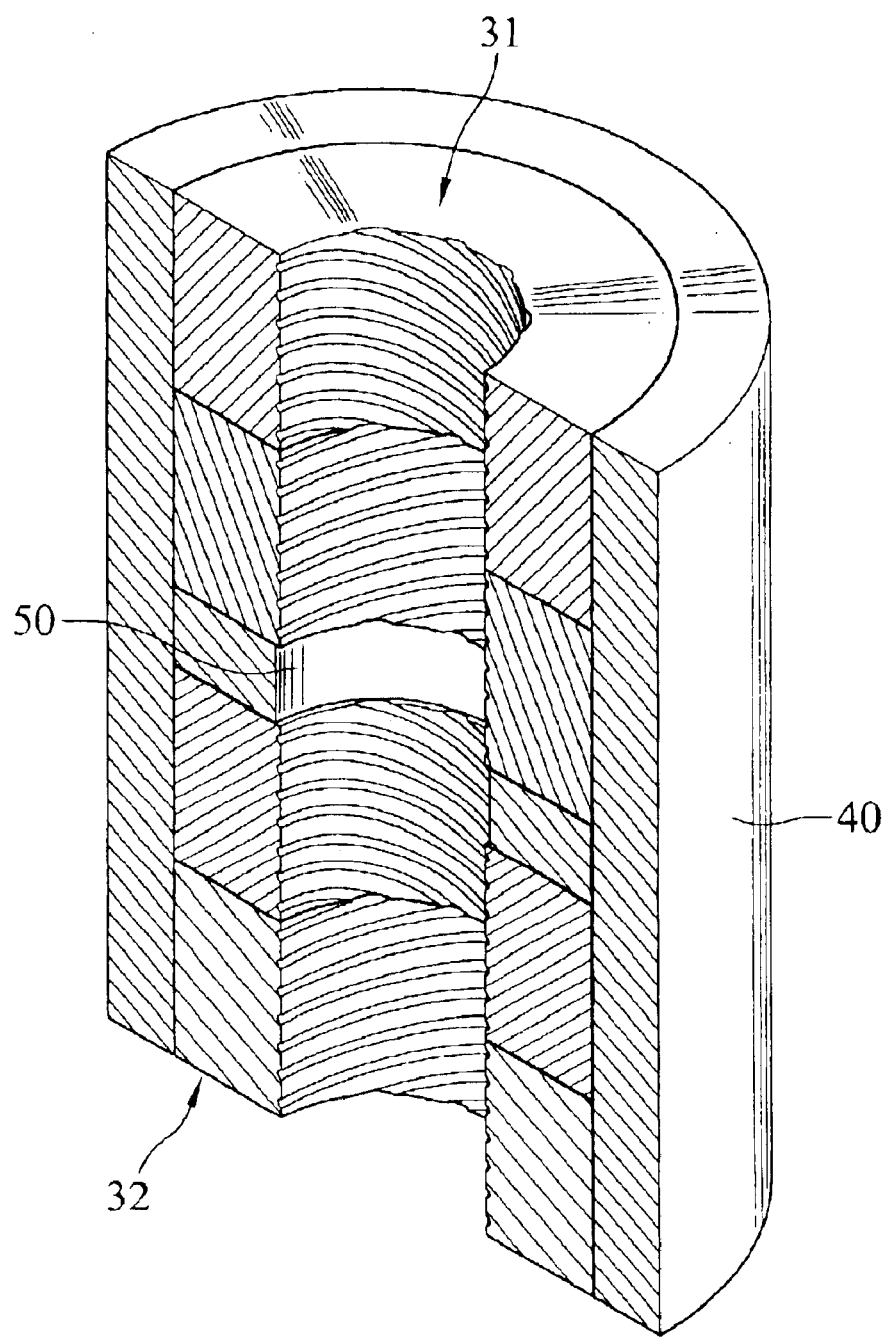
Figure 2E:
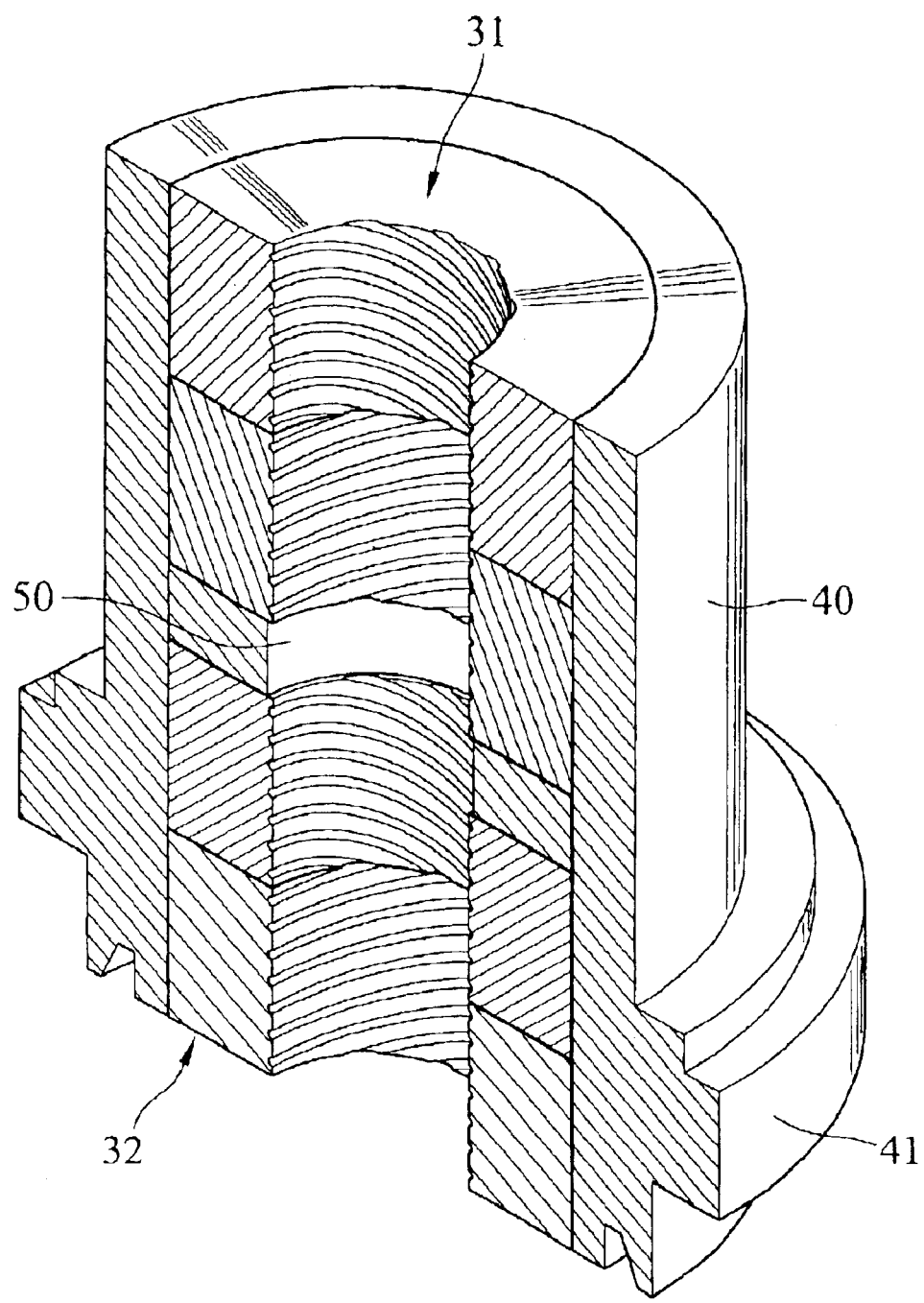
FIG. 2E is a schematic view of a second embodiment of a bearing seat according to the invention.

Referring to FIG. 2C, after the bearing is assembled, it may be installed in a hearing seat 40. The diameter of the inner hole 401 of the bearing seat 40 is substantially the same as the outside diameter of the bearing set 30. A first bearing set 31 and a second bearing set 32 may be fabricated the same way as the bearing set 30. Then the bearing sets 31 and 32 are housed in the bearing seat 40. In order to avoid interference between the grooves of the first bearing set 31 and the second bearing set 32, a spacer 50 may be disposed between the two. The spacer 50 has an inner hole diameter and an outside diameter substantially the same as the first and second bearing sets 31 and 32 to separate the two, and the first bearing set 31, second bearing set 32 and spacer 50 are pressed, bonded or soldered in the inner hole 401 of the bearing seat 40 (as shown in FIG. 2D). Of course, to facilitate practical utilization of the fluid dynamic bearing, a fastening element such as a jutting ring 41 may be formed on the outside surface of the bearing seat 40 (as shown in FIG. 2E) for installation use. The bearing seat 40, spacer 50 and bearing set 30 (or the first bearing set 31 and the second bearing set 32) may be made from copper alloy, stainless steel, steel alloy, or plastics.

Thus by coupling bearings of different slopes alternately with each bearing that has a uniform slope, the fluid dynamic bearing may be fabricated easily with greater precision. Requirements for cutters and precision of the machinery are less critical, and production yield may increase.

Figure 3:
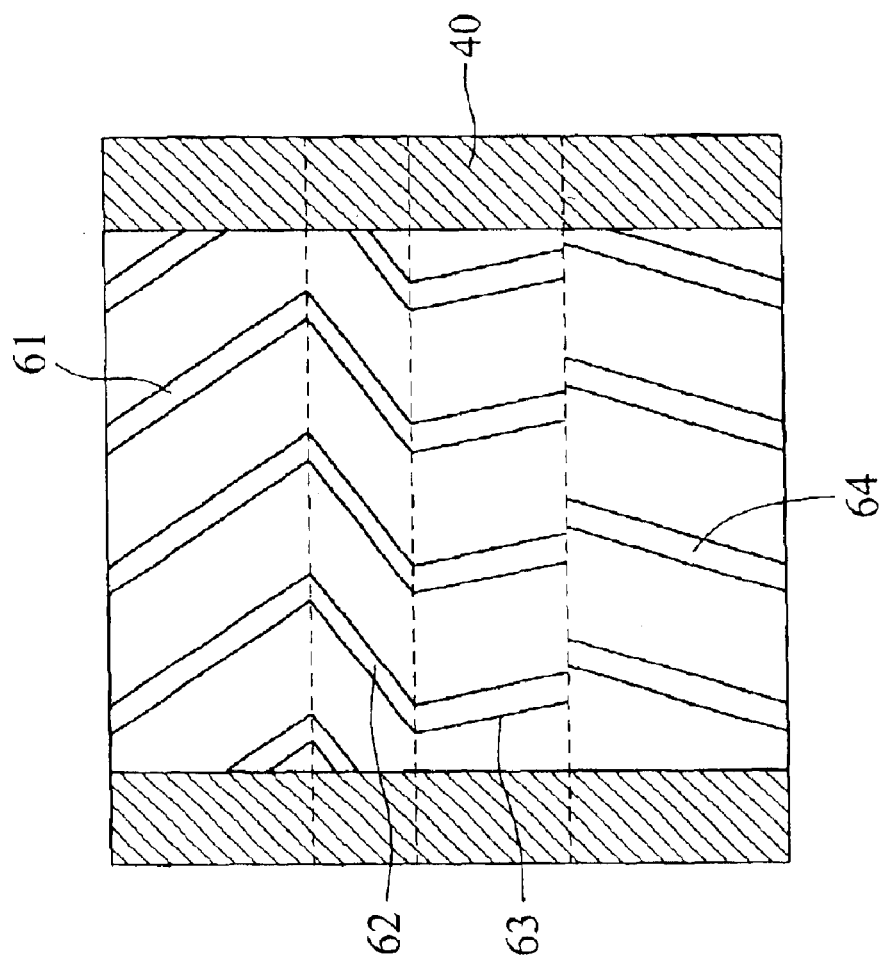
FIG. 3 is a schematic view of another embodiment of the composite pressure-generating grooves of the invention.

In addition to being used for fabricating the "herringbone" grooves, the invention may also adopt alternate assembly to further increase the versatility of pressure-generating grooves. As shown in FIG. 3, a plurality of bearings 61–64 may be coupled and assembled alternately (referring to bearings 61, 62 and 63). Or, the neighboring grooves may be adjoined but not communicate with each other (referring to bearings 63 and 64). Thus the design of the groove is more flexible and versatile. The length of bearings 61–64 may be different. In addition to the "herringbone" grooves or the common fluid pressure-generating grooves, other optimal pressure-generating grooves may be designed. As the bearing is made in a composite fashion, design of the bearing is more versatile and flexible without the limitations occurring with conventional machining of small grooves.

In summary, the composite fluid dynamic bearing and its manufacturing method includes a plurality of bearing sections with grooves of different slopes coupled alternately. Each bearing section has grooves of a uniform slope on the surface of the inner hole. Such a construction has the following advantages:

1. The grooves on the surface of the inner hole with a uniform slope are easier to fabricate than conventional herringbone or other complex grooves, and precision demands for cutters and machinery are less critical.
2. Each bearing section has a shorter length. The grooves on the surface of the inner hole to be fabricated also are shorter. Dimension precision is easier to control, cutting tools are easier to make, and defects of machining may be reduced.
3. The pressure-generating groove is formed in a composite fashion. Design of the pressure-generating groove is more flexible and the products are more versatile. Efficiency of the fluid dynamic bearing also increases.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A composite fluid dynamic bearing for housing a spindle and providing a fluid dynamic pressure to support the spindle when the spindle rotates, comprising:
   a bearing seat having an inner through hole; and
   at least one bearing set having an inner hole with a diameter slightly greater than the spindle and an outside diameter substantially same as the inner hole of the bearing seat and to be housed therein, each bearing set including a plurality of bearings that have grooves of different slopes formed on the surface of the inner holes thereof to form pressure-generating grooves, the grooves formed on the surface of the inner hole of each bearing having substantially a uniform slope.

2. The composite fluid dynamic bearing of claim 1, wherein the grooves on the surface of the inner hole of the bearing are helical grooves of a uniform slope.

3. The composite fluid dynamic bearing of claim 2, wherein the helical grooves form herringbone pressure-generating dynamic grooves by coupling the bearing sets that have the helical grooves formed in different directions.

4. The composite fluid dynamic bearing of claim 1, wherein the bearing sets are interposed by a spacer, the spacer having an inner diameter same as the bearing.

5. The composite fluid dynamic bearing of claim 1, wherein the bearing sets are selectively installed in the bearing seat by bonding, pressing, or welding.

6. A method for manufacturing a composite fluid dynamic bearing, comprising steps of:
   providing a plurality of bearings that have grooves of different slopes formed on the surface of the inner holes thereof, the grooves on each bearing having substantially a uniform slope;

coupling the bearings alternately; and installing the bearings in a bearing seat.

7. The method of claim 6, wherein the step of providing a plurality of bearings that have grooves of different slopes formed on the inner holes thereof is accomplished by machining respectively inner grooves of different directions on bearings of desired lengths.

8. The method of claim 7, wherein the step of machining respectively inner grooves of different directions on bearings of desired lengths is followed by cutting the bearings to smaller sections.

9. The method of claim 7, wherein the grooves formed on the surface of the inner holes are helical grooves.

10. The method of claim 9, wherein the helical grooves are formed in different directions alternately.

11. The method of claim 10, wherein the pressure-generating grooves are herringbone grooves.

12. The method of claim 6, wherein the step of coupling the bearings alternately includes installing a spacer.

13. The method of claim 6, wherein the spacer has an inner diameter same as the bearing.

14. The method of claim 6, wherein the bearings are installed in an inner hole of the bearing seat.

15. The method of claim 14, wherein the bearings are selectively installed by bonding, pressing, or welding.

* * * * *